United States Patent
Johansson

(10) Patent No.: US 6,368,018 B2
(45) Date of Patent: Apr. 9, 2002

(54) INSTALLATION FOR STORING OF NATURAL GAS

(75) Inventor: Jan Hugo Johansson, Stockholm (SE)

(73) Assignee: Sydkraft AB, Malmo (SE)

( * ) Notice: Subject to any disclaimer, the term of this patent is extended or adjusted under 35 U.S.C. 154(b) by 0 days.

(21) Appl. No.: 09/726,069

(22) Filed: Nov. 29, 2000

Related U.S. Application Data

(63) Continuation of application No. PCT/SE99/00981, filed on Jun. 7, 1999.

(30) Foreign Application Priority Data

Jun. 5, 1998 (SE) ............................................... 9801994

(51) Int. Cl.⁷ ............................................... B65G 5/00
(52) U.S. Cl. .......................................... 405/55; 405/53
(58) Field of Search ............................ 405/52, 53, 55, 405/57

(56) References Cited

U.S. PATENT DOCUMENTS

| | | | |
|---|---|---|---|
| 3,151,416 A | * 10/1964 | Eakin et al. | 52/741.12 |
| 3,683,628 A | 8/1972 | Tabary | |
| 4,915,545 A | * 4/1990 | Ferrari | 405/53 |
| 5,018,639 A | 5/1991 | Schäfer | |
| 5,749,675 A | * 5/1998 | Ferrari | 405/52 |
| 5,919,300 A | * 7/1999 | Burge et al. | 106/727 |

FOREIGN PATENT DOCUMENTS

| | | |
|---|---|---|
| EP | 0 005 133 | 4/1979 |
| EP | 0 153 550 | 2/1984 |
| EP | 0 401 154 A1 | 12/1990 |
| GB | 493893 | 10/1938 |
| GB | 2 215 023 A | 9/1989 |
| SE | 616124 * | 3/1980 |
| WO | WO 85/04214 | 9/1985 |
| WO | WO 86/01559 | 3/1986 |
| WO | WO 87/00151 | 1/1987 |
| WO | WO 89/02864 A1 | 4/1989 |
| WO | WO 90/08241 | 7/1990 |

* cited by examiner

Primary Examiner—David Bagnell
Assistant Examiner—Sunil Singh
(74) Attorney, Agent, or Firm—Luedeka, Neely & Graham, P.C.

(57) ABSTRACT

An installation for storing of natural gas or some other fluid comprises a lined underground storage space. Inside the rock wall of the storage space, there is a concrete layer for supporting an inner impermeable lining layer. According to the invention, the concrete layer has a crack distribution control reinforcement layer closer to the impermeable lining layer than to the rock wall in order to divide large cracks in to smaller cracks and to distribute the cracks over a larger area of the impermeable lining layer. Also according to the invention, there is provided between the impermeable lining layer and the concrete layer a non-binding sliding layer to facilitate relative movements between the impermeable lining layer and the concrete layer.

5 Claims, 2 Drawing Sheets

INSTALLATION FOR STORING OF NATURAL GAS

Figure 1:
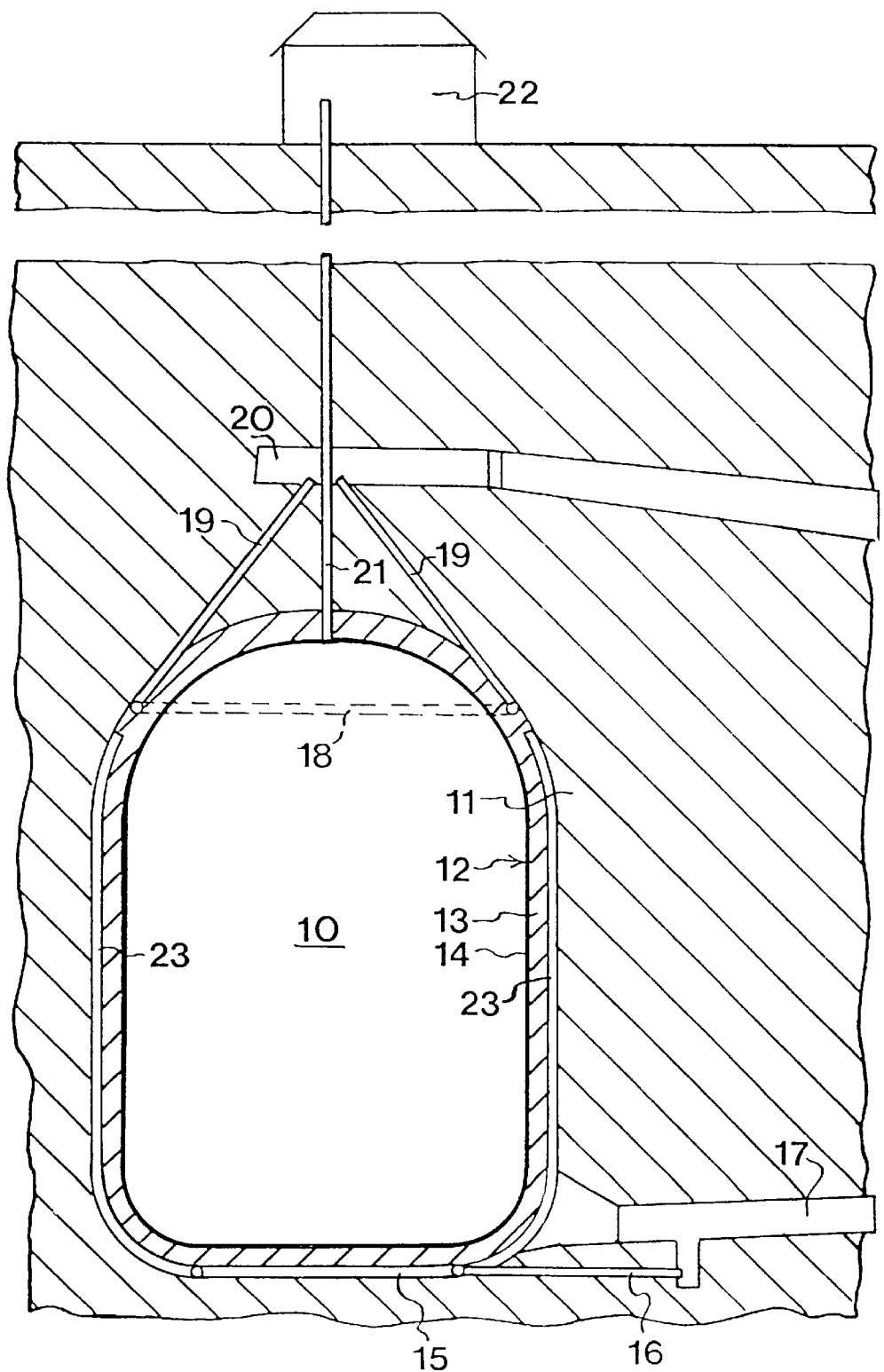

This application is a continuation of PCT/SE99/0098, filed Jun. 7, 1999.

The present invention relates to an installation for storing of natural gas at high pressures of between about 3 and about 25 MPa and temperatures of from about −30° C. to about 60° C., in a lined underground storage space.

A rock cavity for storing of natural gas under pressure must fulfil a number of general criteria in respect of the pressure-absorbing capacity; among other things, the rock cover above the storage space must be capable of preventing up-lift or elevation, and the deformations in the surrounding rock must be limited when subjected to the existing pressure, such that they do not result in the elongation capacity of the impermeable lining layer being exceeded. In addition, it must be possible to drain groundwater from the surrounding rock to prevent damage to the impermeable lining layer of the storage space, said impermeable lining layer in most cases being made of steel plate.

The vital part of a lined gas storage space is a sandwich element which comprises the impermeable lining layer (in most cases steel plate, but in some cases also plastic), the concrete layer and the surrounding rock. Each of these elements has a function, i.e. the impermeable lining layer has the gas-sealing function, the concrete casing has the pressure-transmitting function and, finally, the rock has the pressure-absorbing function. At the same time the three elements must work together although it is a matter of a complex interaction between the structural parts when the system is pressurised. It is in fact important for the sandwich construction to retain its impermeability also after being subjected to pressure. The application of pressure leads to cracking in the concrete layer and deformation of the impermeable lining layer. The construction must, however, counteract the development of cracks in the impermeable lining layer. Furthermore the construction should be such as to allow draining of groundwater.

When storing pressurised natural gas in rock cavities, an impermeable lining layer of steel plate has been suggested in most cases. In this connection, use has been made of either steel plate or steel sheet. In a lined rock cavity concept, a pressure of up to 20 MPa has frequently been used.

To reduce the risk of leakage in the rock mass, a drainage layer has sometimes been arranged between the impermeable lining layer and the rock wall. WO 90/08241 describes this known technique. According to this publication, a gas storage tank has an inner shell of steel plate supported by a layer of corrugated steel sheet. The latter layer is anchored to the rock wall by means of rock bolts and has inwardly directed fixing projections that serve as attachments for the impermeable lining layer so as to prevent it from moving relative to the layer of corrugated steel sheet.

WO 86/01559 discloses one more known technique for lining a gas storage rock cavity. As impermeable lining layer, use is made of an inner shell made of steel plate, surrounded and supported by annular connecting elements. These are anchored to the rock wall and also to the steel plate inner shell. Between the inner shell and the rock wall there is a filling material which in some embodiments consists of on-site cast concrete.

A similar technique is disclosed in EP-B-0 153 550, which concerns a method of building large cylindrical storage tanks with concentric plate walls, of which the outer abuts against a prestressed concrete wall and between which an insulating layer is arranged.

EP-A-0 005 133 also discloses a gas storage tank which is placed in a rock cavity shaft and stands freely in this shaft. In one embodiment, the shaft is provided with a lining of water-tight concrete and a cast concrete floor.

EP-A-0 401 154 discloses a free-standing gas storage tank with a gas-tight inner wall made of steel plate material and a force-absorbing outer wall made of prestressed concrete, an insulating layer being arranged between the inner wall and the outer wall.

WO 85/04214 also discloses a rock cavity storage space for storing, inter alia, gases. In this case, the rock wall has first been provided with a water-permeable layer of sprayed concrete, which serves as a drainage layer for groundwater and which constitutes a supporting surface for an inner lining of, for instance, concrete and steel plate.

WO 89/02864 discloses a rock cistern for pressurised storing of natural gases. The walls of the cistern comprise a sprayed concrete layer next to the rock wall which is reinforced through anchoring bolts. The concrete layer is covered by a sealing comprising one reinforced sealing layer and one unreinforced plastics layer. The layers are bonded to the rock surface by means of a binding layer which serves to transfer stresses, in the form of limited shear stresses, between the sprayed concrete and the overlaying sealing layer.

GB-A-2 215 023 discloses an underground fluid storage cavern for storing low pressures of 0.1 to 5 MPa at temperatures of −80 to −170° C. The cavern wall comprises a tight inner layer and a porous concrete layer between the rock surface and the tight inner layer. Compressed air is fed into this porous concrete layer to maintain the air pressure at a pressure greater than the ground water pressure.

U.S. Pat. No. 3,683,628 discloses a reservoir for storing fluids in underground cavities. In this case sheets of impermeable plastic material are secured placed between a concrete layer and a fluid tight flexible liner. This reservoir is not suited for the storing of natural gas at high pressures of between about 3 and about 25 MPa and temperatures of between about −20° C. and 60° C.

GB-A-493 893 discloses a cistern or reservoir for the storage of hydrocarbon fluids at about atmospheric pressure. The cistern wall comprises several layers which are separated by and bonded to each other by means of a plastics layer. This construction is not suited for the storage of natural gas at the pressures and temperatures contemplated herein.

WO 87/00151 discloses rock cavern having a wall comprising a drainage layer and a concrete layer next to the rock and a sealing layer next to the inside of the cavern. The concrete layer is bolted to the rock. The sealing layer consists of thin steel sheet strips welded together and spot-welded to a strip steel attached to the concrete layer.

The known embodiments of rock cavity storage spaces for storing pressurised gas have various drawbacks, inter alia, that there is still a great risk of cracking in the impermeable lining layer and harmful cracking in the concrete layer supporting the impermeable lining layer.

One object of the present invention therefore is to provide a gas storage installation, in which these and other drawbacks are eliminated or considerably reduced.

This and other objects of the invention are achieved by a storage installation as described herein below.

In summary, the invention is related to an installation for storing of natural gas or some other fluid, e.g. compressed air. This installation comprises a lined underground storage space. Inside the rock wall of the storage space there is a concrete layer for supporting an inner impermeable lining layer. According to the invention, there is between the impermeable lining layer and the concrete layer a non-binding sliding layer to facilitate relative movements between the impermeable lining layer and the concrete layer. The concrete layer has a crack distribution control reinforcement layer closer to the impermeable lining layer than to the rock wall. The basic idea of the invention is not to completely avoid the propagation of cracks from the rock through the concrete layers to the impermeable lining layer but to intentionally distribute the cracks over a larger area by dividing large cracks into several smaller cracks, thus distributing shear forces acting on the impermeable lining layer over a larger area thereof.

Such a distribution of shear forces decreases the risk of deforming the lining layer to such a degree that cracks develop in the impermeable lining layer also when the impermeable lining layer is subjected to cyclic deformation during use of the cavern.

Figure 2:
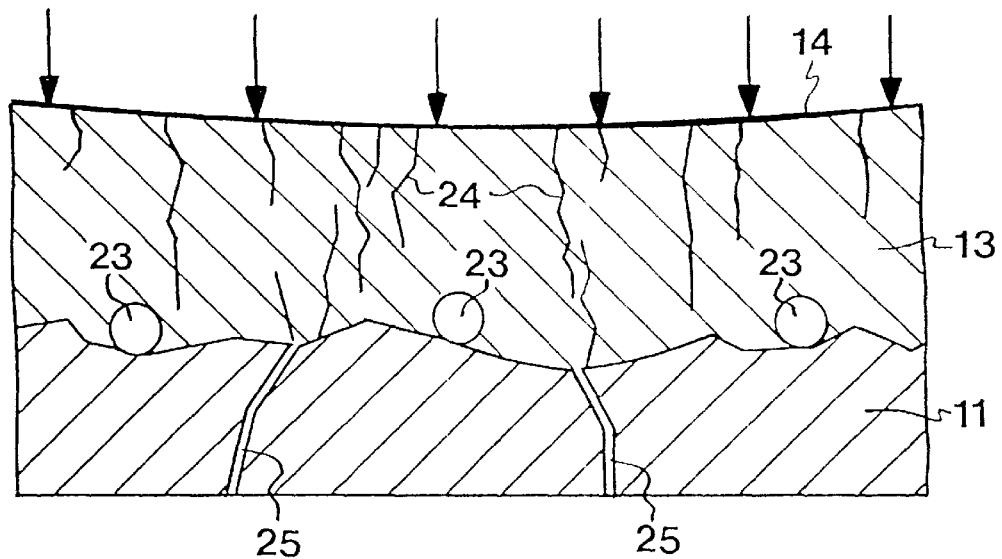
Figure 3:
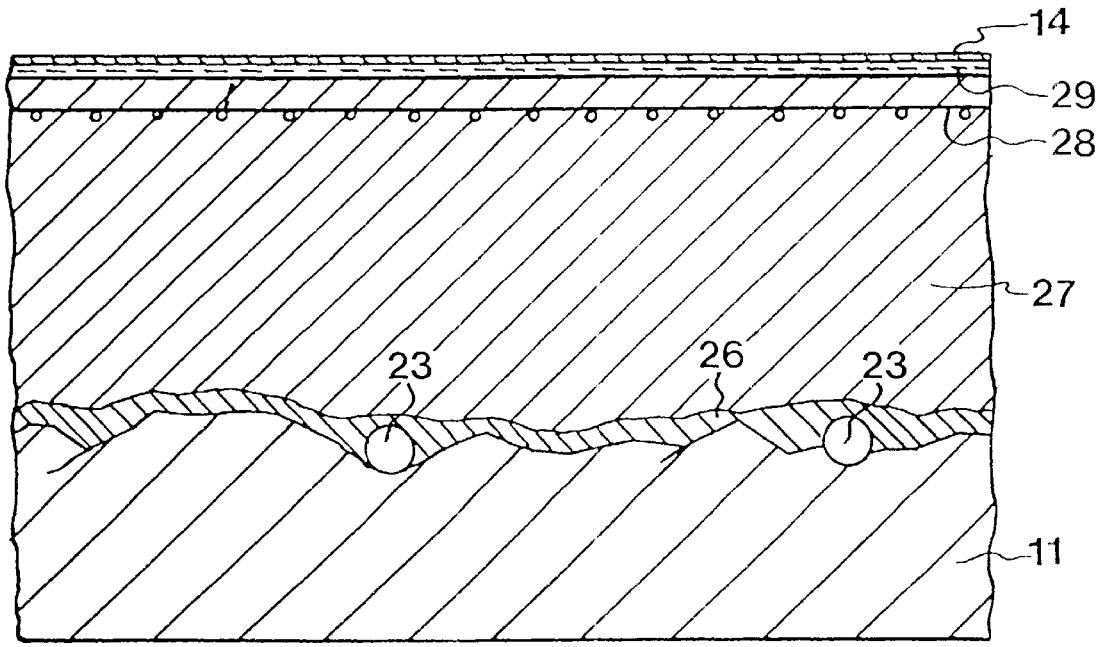

An embodiment of an installation according to the present invention will now be described in more detail with reference to the accompanying drawings, in which FIG. 1 is a schematic view of an installation for storing of natural gas in a lined rock cavity;

FIG. 2 shows an example of a known technique for designing the lining in such a rock cavity or storage space; and FIG. 3 shows an embodiment of the lining in an installation according to the present invention.

FIG. 1 shows schematically an embodiment of an installation for storing of natural gas in an underground rock cavity. The installation comprises a storage space or rock cavity 10 with a rock wall 11 with a lining 12. The lining 12 comprises a concrete layer 13 adjacent to the rock wall 11 and an impermeable lining layer 14 adjacent to the actual storage space.

From the upper end of the storage space 10 extends a feed and discharge pipe 21 for gas injection and gas withdrawal. The pipe 21 is connected to a station for metering, pressure regulation and compression of the gas in a surface installation 22.

In a common type of known installations of this type use is made of a lining of the type shown in FIG. 2. In this case, the drainage pipes 23 have been arranged closest to the rock wall 11. The impermeable lining layer 14 is made of steel plate which abuts directly against the concrete layer 13. When the installation is pressurised or if settlements should occur in the surrounding rock, cracks 24 may form in the concrete layer. In many cases, cracks 25 also form in the rock wall 11. In cracking, a deformation of the impermeable lining layer or steel plate 14 will occur, and with no crack control the deformation can be so considerable that microcracks or larger cracks may appear in the impermeable lining layer.

FIG. 3 shows how the risk of leakage can be reduced or completely eliminated. In the installation according to the present invention, the lining has been built up in a special manner. Like in prior-art technique, drainage pipes 23 can be arranged closest to the rock wall 11. In the embodiment shown, these drainage pipes 23 have been covered with a porous layer 26 of sprayed concrete (or "shotcreate"). The porous layer 26 of sprayed concrete has two functions. One is to serve as a layer making it difficult for cracks in the rock wall 25 from propagating inwards to the centre of the tank through intervening layers, and the other is to increase the transport of liquid or fluid to the drainage pipes 23.

On the outside of the layer 26 of sprayed concrete there is a further concrete layer 27, which preferably is of a type that will be described in more detail below. According to the invention a reinforcement 28 which preferably consists of a welded mesh reinforcement is arranged closer to the surface of this concrete layer 27 and the impermeable lining 14 than to the rock wall 11. As shown, this welded mesh reinforcement is arranged close to the impermeable lining 14. At present, mesh sizes in the range of from about 5 or 10 cm to about 40 or 30 cm are considered appropriate for the intended purpose.

Also according to the invention, a non-binding sliding layer 29 is arranged between the concrete layer 27 and the impermeable lining layer 14 made of steel plate. The non-binding sliding layer can be made of a material with good viscous properties such as asphalt or bitumen, which can contain its own reinforcement. The purpose of the non-binding sliding layer is to facilitate a relative movement between the concrete layer 27 and the impermeable lining layer 14 in order to distribute the deformation imposed by the opening and closing of cracks in the concrete, over a longer distance and thus to smoothening out peak strain in the lining.

By arranging the reinforcement in the outer part of the concrete layer any larger cracks propagating from the rock wall through the concrete layer will be intentionally divided into smaller cracks and distributed over a larger area of the wall. Thus, shear stresses acting on the lining layer 14 due to the formation of cracks will be distributed over a larger area of the lining layer 14. This distribution of shear forces decreases the risk of deforming the lining layer to such an extent that microcracks or other cracks develop in the impermeable lining layer due to cyclic deformation during the use of the storage cavern.

In fact, it has been found that the distribution of the cracks and the relative movement between the concrete and lining layers considerably reduces the tendency to cracking in the impermeable lining layer, which will probably be due to the fact that the shear forces are distributed over a larger surface area of the lining so that the tractive forces are not directly transferred from the concrete layer 27 to the impermeable lining layer 14 when cracks arise in the concrete layer.

In prior-art constructions of the type shown in FIG. 2, there is thus in many cases strong adhesion between the impermeable lining layer and the concrete layer. Further, in prior-art constructions an intentional division of larger cracks into smaller cracks has not been suggested.

To further reduce the tendencies to cracking in the impermeable lining layer, the concrete layer 27 in an installation according to the present invention could be made of so-called self-compacting concrete containing additives which result in the need for vibration being obviated. Thus it is a matter of a self-compacting type of concrete which resembles flow concrete but, in contrast, need not be vibrated to achieve a high degree of non-porousness. By using this type of concrete, the risk of cracking in the concrete layer 27 will be even smaller since cracking in concrete in many cases depends on precisely insufficient vibration during the casting process. Further such a type of concrete will also make it possible to decrease the wall thickness of the concrete wall and to reduce the risk of unwanted cavity formation and voids to develop in the concrete wall.

What is claimed is:

1. An installation for storage of natural gas or some other fluid adjacent a rock wall, said installation comprising a lined underground storage space having a gas-sealing impermeable lining layer and a concrete layer between the impermeable lining layer and the rock wall, wherein the concrete layer has a crack distribution control reinforcement layer adjacent the impermeable lining layer for dividing larger cracks into smaller cracks, and a sliding layer between the concrete layer and the impermeable lining layer to facilitate relative movement between the impermeable lining layer and the concrete layer.

2. An installation as claimed in claim 1, further comprising a layer of sprayed-on porous concrete between the rock wall and the concrete layer.

3. An installation as claimed in claim 2, further comprising drainage pipes enclosed in the layer of porous sprayed-on concrete.

4. An installation as claimed in claim 1, wherein the crack distribution control reinforcement comprises a welded mesh reinforcement.

5. An installation as claimed in claim 1, wherein at least a portion of the concrete layer arranged closest to the impermeable lining layer is made of self-compacting concrete.

* * * * *